United States Patent [19]
Moschner

[11] 4,094,462
[45] June 13, 1978

[54] METHOD AND MEANS FOR PROVIDING AND TESTING SECURE IDENTIFICATION DATA

[75] Inventor: John L. Moschner, Centerville, Ohio

[73] Assignee: NCR Corporation, Dayton, Ohio

[21] Appl. No.: 710,827

[22] Filed: Aug. 2, 1976

[51] Int. Cl.² .......................... G06F 7/02; G06K 7/08
[52] U.S. Cl. ..................................... 235/419; 235/449
[58] Field of Search .............. 340/149 A; 235/61.7 B, 235/61.7 R, 61.11 E, 61.11 D, 61.12 M, 61.12 N; 178/22, 17; 250/569

[56] References Cited

U.S. PATENT DOCUMENTS

| | | | |
|---|---|---|---|
| 3,657,521 | 4/1972 | Constable | 235/61.7 B |
| 3,731,085 | 5/1973 | Bostrom | 235/61.11 D |
| 3,764,742 | 10/1973 | Abbott | 235/61.7 B |
| 3,829,661 | 8/1974 | Silverman | 235/61.7 B |
| 3,846,622 | 11/1974 | Meyer | 235/61.11 D |
| 3,862,716 | 1/1975 | Black | 340/149 A |
| 4,013,894 | 3/1977 | Foote | 235/61.7 B |
| 4,023,013 | 5/1977 | Kinker | 235/61.7 B |

*Primary Examiner*—Robert M. Kilgore
*Attorney, Agent, or Firm*—J. T. Cavender; Albert L. Sessler, Jr.

[57] ABSTRACT

Method and means are disclosed for providing and testing a secure identification medium on which is encoded uniqueness information and security information in addition to customer information. The security information is generated from the uniqueness information and the customer information by means of algorithm processing means and is then compared with the security information read from the record medium. The algorithm processing means is also employed in generating the security information in the first instance for encoding said information on said record medium initially. Failure in the comparison of the security information encoded on the record medium with that generated by the algorithm processing means provides an indication that the record medium is not a legitimate one.

21 Claims, 3 Drawing Figures

METHOD AND MEANS FOR PROVIDING AND TESTING SECURE IDENTIFICATION DATA

BACKGROUND OF THE INVENTION

Identification media such as plastic credit cards and debit cards have become widely employed in commerce, particularly in retail and financial systems, for the purpose of positively and accurately identifying to the system the legitimacy of the card to enable the holder of the card to consummate a desired transaction. In many instances, a magnetic stripe has been incorporated into the card to permit various categories of customer and account information to be read from and optionally written on the card by suitable electronic equipment associated with the system.

The ease of reading from and writing on the magnetic stripe has become a source of fraud in debit and credit card usage. Without great effort or extensive knowledge of the system, a criminal can counterfeit or duplicate a card, and the data stored on the magnetic stripe of the card can be altered, to allow fraudulent access to the system. Various ways of producing counterfeit cards or altering magnetic stripe information on legitimate cards have been well documented in the literature.

In order to thwart the possibility of such criminal actions which could result in substantial financial loss to the proprietors of the systems with which the cards are used, the concept of a "secure" card has been introduced. Secure card techniques may rely upon the incorporation of permanent physical uniqueness data in the structure of a card, with said data not being subject to alteration, so that one card may be distinguished from another by sensing of this physical data. In order to avoid excessive complications in card manufacture and distribution, it is highly desirable that this uniqueness data be independent of customer-related information, such as an account number. Incorporating the account number into the uniqueness data, for example, would seriously disrupt present card manufacturing and distribution practices. With the uniqueness information independent of the customer-related information, it then becomes important from the requirement of positive and accurate card validity determination to provide a verification means which encompasses both the uniqueness information and the customer-related information.

SUMMARY OF THE INVENTION

The purpose of the present invention is to provide a method and means for combining the uniqueness data and the customer-related data on a customer identification medium in such a manner as to deter improper or unauthorized use of an identification medium such as a plastic credit or debit card without excessively complicating the manufacture, distribution and usage of the identification medium.

In carrying out the method, the uniqueness information is incorporated into the physical structure of the card at the time of its manufacture. A number of known means are available by which uniqueness information can be permanently encoded into the structure of a card. One suitable means involves the use of diffraction grating encoding means, and is disclosed in the co-pending U.S. application Ser. No. 588,937, filed June 20, 1975, now United States patent No. 4,034,211, issued Jul. 15, 1977, and assigned to the assignee of the present application.

Customer identification information, such as a customer account number, is recorded on a magnetic stripe on the card, as is an additional number, hereinafter referred to as a security number, which is derived from both the uniqueness information and the customer identification information. This derivation is accomplished by a method involving the use of a novel algorithm. Means for implementing the algorithm are provided.

The value of the security number is recorded on the card at the time of the initial encoding process. Subsequently, when the card is used, the values of the account number, the uniqueness quantity, and the security number will be sensed from the card. The account number and the uniqueness quantity will again be processed by the means embodying the algorithm to generate a security number for comparison with the security number which has been sensed from the card. If the numbers do not match, the card will be rejected as possibly counterfeit, and the transaction will not be allowed to proceed. If desired, the rejection of the card may be accompanied by appropriate means such as locking up of the system utilizing the card, capture of the card by the system, or initiation of an alarm indication, such as a visual or audible signal to alert the operator of the system to the presence of an illegitimate card.

According to one embodiment of the invention, a method for testing the legitimacy of an identification element comprises the steps of sensing at least three categories of information from said identification element, performing a mathematical operation utilizing at least two of said categories of information, and comparing the result of said mathematical operation with another of said categories of information.

According to a second embodiment of the invention, apparatus for testing the legitimacy of an identification element comprises sensing means for sensing first, second and third categories of information from said identification element, first storage means for storing the first category of information sensed from the identification element, second storage means for storing the second category of information sensed from the identification element, third storage means for storing the third category of information sensed from the identification element, information processing means to generate output data from a specified sequence of operations performed upon said first and second categories of information transmitted to said information processing means from said first and second storage means, and comparison means for comparing said output data with said third category of information transmitted from said third storage means and capable of indicating whether or not said output data and said third category of information are identical.

According to a third embodiment of the invention, apparatus for generating a security number from first and second data representations comprises means for making the length of the two data representations equal, means for multiplying each of the two equal-length data representations by a constant to produce two data products, means for permuting in an arbitrary manner the order of the individual elements of the two data products to produce two permuted data products, and means for combining the two permuted data products by a plurality of available functions to provide a security number derived from said first and second data representations.

It is accordingly an object of the present invention to provide a method for testing the legitimacy of an identification element.

Another object is to provide apparatus for testing the legitimacy of an identification element.

Another object is to provide a method for generating a security number from first and second quantities.

A further object is to provide a method of generating a security number from a represented account number and a represented uniqueness number.

Still another object is to provide apparatus for generating a security number from first and second numerical quantities.

With these and other objects, which will become apparent from the following description, in view, the invention includes certain novel features and combinations of parts, a plurality of forms or embodiments of which are hereinafter described with reference to the drawings which accompany and form a part of this specification.

DETAILED DESCRIPTION OF THE PREFERRED EMBODIMENTS

Figure 1:
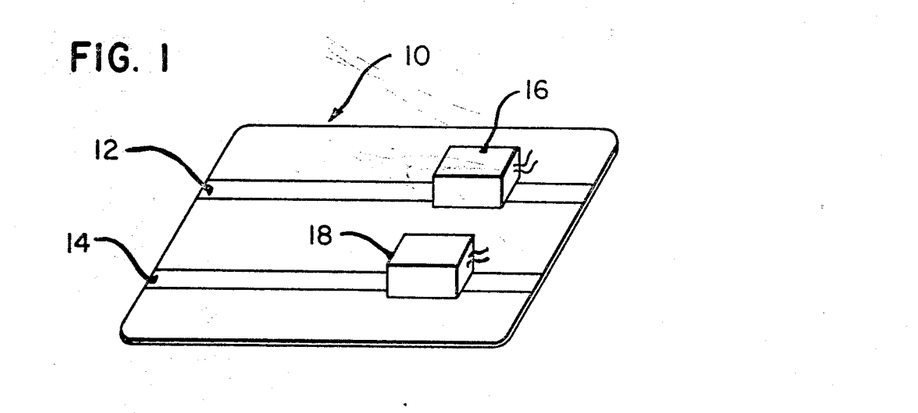
FIG. 1 is a diagrammatic representation of a credit card or other identification medium having two information bearing tracks positioned in operative relation to corresponding sensing and/or recording means.

Referring now to FIG. 1, there is shown an identification medium, such as a credit card 10, having thereon a first stripe 12 and a second stripe 14, both capable of storing information therein. It will be recognized that different numbers and arrangements of stripes or code-bearing areas on the card may be employed, and that various materials and encoding means may be used for the stripes or areas. In the illustrated embodiment, the stripe 12 is a magnetic stripe, wherein information may be recorded or erased and from which information may be sensed. Stripe 14, on the other hand, stores information permanently, so that there can be no erasure or re-recording of information. As mentioned previously, one suitable structure for this stripe involves the use of diffraction grating encoding means, and is disclosed in the previously mentioned co-pending United States application Ser. No. 588,937, filed June 20, 1975, and assigned to the assignee of the present application.

Shown in FIG. 1 as co-acting with the magnetic stripe 12 is a magnetic read-write head 16, capable of sensing information encoded on the stripe 12 and, where appropriate, of erasing said information and re-cording other information in its place. It may be noted, however, that for the purpose of the present invention, there is no need for the erasing or recording capability of the head 18, except in the case of the original encoding of the card 10 with the security number.

In the illustrated embodiment of FIG. 1, the information to be carried on the stripe 12 includes a customer account number and/or other customer-related data and a security number which is derived from a combination of the customer-related number with another quantity, as will subsequently be described. Other information may also be included on this stripe, but is not pertinent to the present invention.

Shown as co-acting with the diffraction grating stripe 14 is a reading head 18 which may be of the general type disclosed and claimed in the previously mentioned co-pending U.S. application Ser. No. 588,937. Another type of reading head which may be employed when a multiple diffraction grating is utilized in the stripe 14 is shown in the co-pending U.S. application Ser. No. 611,378, filed Sept. 8, 1975, now United States patent No. 4,023,010, issued May 10, 1977, and assigned to the assignee of the present application.

The information to be carried on the stripe 14 is what will be referred to herein as a uniqueness number. This number is incorporated into the physical structure of the card 10 at the time of its manufacture. To avoid complications in the manufacture and distribution process, the uniqueness number must be independent of any customer-related data, such as the customer account number. The uniqueness number will vary from card to card but is completely independent of customer-related data.

As is well known, heads 16 and 18 are capable of sensing information from the stripes 12 and 14 when the stripes are placed in close proximity to the heads and when relative movement between the stripes and the heads is provided. Recording is accomplished in a similar manner, in the case of the magnetic stripe 12 and its corresponding head 16.

Figure 2:
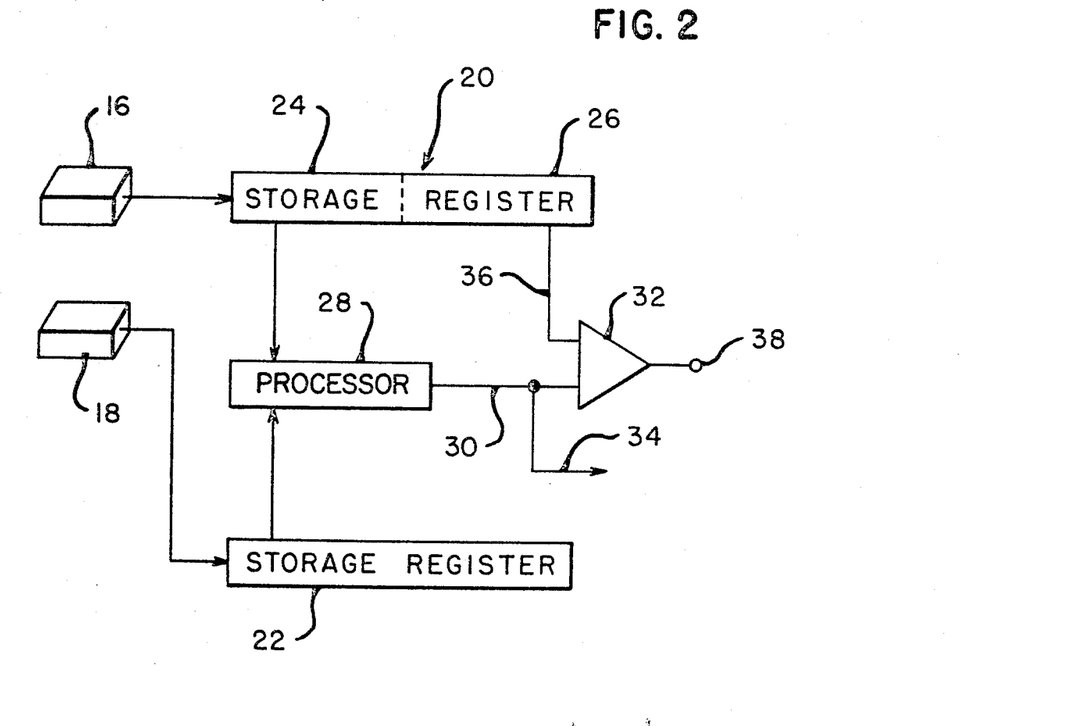
FIG. 2 is a block diagram of a system for testing the legitimacy of a credit card or other identification medium.

Shown in FIG. 2 is a schematic diagram illustrating one manner in which the information stored in the stripes 12 and 14 is utilized to determine the legitimacy of the card 10. As mentioned previously, both a customer number or other customer-related data and a security number are stored in the stripe 12, while a uniqueness quantity is stored in the stripe 14. Reading of the card 10 by the heads 16 and 18 causes the information sensed from the stripe 12 to be stored in a storage register 20 and also causes the information sensed from the stripe 14 to be stored in a storage register 22. The storage register 20 is effectively divided into two sections 24 and 26, so that the customer number or other customer-related data sensed from the stripe 12 is stored in the section 24, while the security number sensed from the stripe 12 is stored in section 26.

Both the customer number or other data stored in the section 24 of the register 20 and the uniqueness quantity stored in the register 22 are input into an algorithm processor 28, shown as a single block in FIG. 2. The operation of one form of algorithm processor will subsequently be described in detail, but it will suffice for the present time to say that the customer number or other data and the uniqueness quantity are combined in accordance with a predetermined mathematical relationship in the algorithm processor 28 to produce a security number which is transmitted over a conductor 30 to one of two inputs to a comparator 32. A branch 34 extending from a conductor 30 between the processor 28 and the comparator 32 provides an output from which the security number generated by the algorithm processor 28 may be taken for connection to a recording head for recording a security number on a new card, or for other suitable purpose. The other input to the comparator 32 is taken directly over a conductor 36 from the section 26 of the storage register 20, which, it will be recalled, stores the security number sensed from the track 12 of the card 10.

The comparator 32 is of a well-known type capable of comparing the information appearing at each of its two inputs, and of providing a signal at its output 38 to indicate whether or not the security number sensed from the card 10 is identical to that generated in the algorithm processor 28 from the customer number or other data and the uniqueness quantity which are also sensed from said card. The signal at the output 38 can then be used in any desired manner to indicate whether or not the desired identity between the two quantities exists. For example, in the case of a failure of identity, the machine in which the card is being used may be rendered incapable of further functioning; or the card may be captured by the machine; or some type of audible, visual or other alarm indication may be given.

It is essential that customer-related data, such as a customer account number, be included as an input parameter for the algorithm processor 28. If such customer-related data is not included, a criminal could employ a process known as "selective skimming" in order to gain unauthorized access to accounts other than his own. In selective skimming, a typical procedure would be for a criminal to copy the account number and other appropriate data from a stolen card onto his own legitimate card by means of an easily constructed magnetic recording device. The significance of "selective" skimming is that the criminal would not alter the area on the track 12 containing the security number. He would then have a duplicate of the stolen card, except that the uniqueness number and the security number would be unchanged from their original values. If the security number generated by the checking algorithm were generated solely from the uniqueness number, the fraudulent card would still pass the security test. A significant feature of the present invention therefore is the implementation of an algorithm which incorporates customer-related data, such as an account number, as an essential input to the security number algorithm. Customer-related data other than the account number may of course be utilized if desired.

Figure 3:
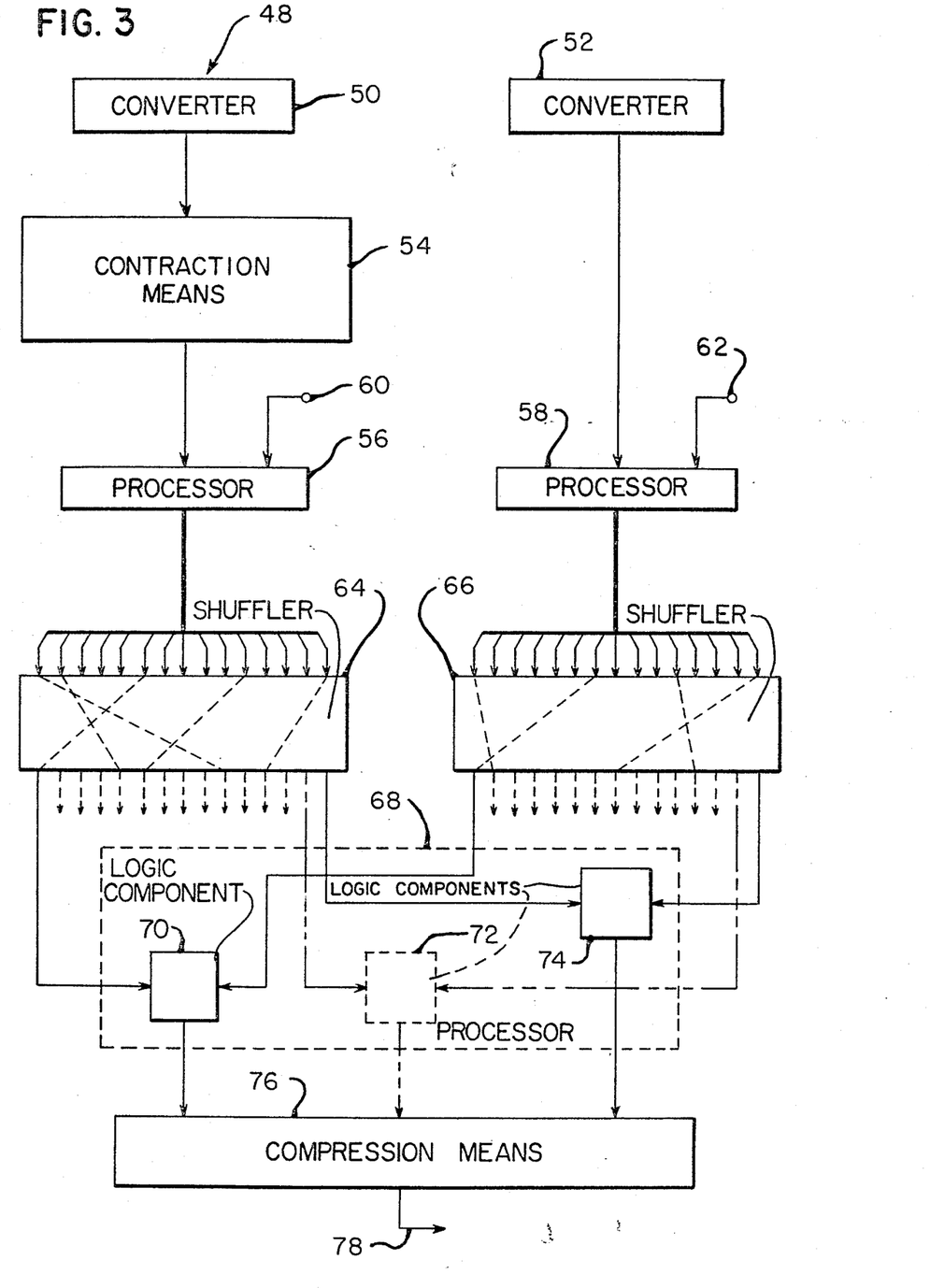
FIG. 3 is a block diagram of a system for generating a security number from two quantities such as customer identification data and uniqueness data.

One suitable algorithm which may be employed for mapping of an account number or other customer-related data and a uniqueness quantity is implemented in the system 48 schematically shown in FIG. 3. It will be realized that many different types of mathematical operations and combinations thereof may be employed to produce a security number derived from a combination of customer data such as an account number and a uniqueness number. Thus the system 48 of FIG. 3 is only one of many forms which the algorithm processor 28 of FIG. 2 may take. This system may be implemented in any one of several ways, such as by the use of discrete units for each of the various functional blocks set forth, or by the use of suitably programmed data processing equipment.

The system 48 of FIG. 3 includes two code converters 50 and 52 for converting encoded information on the card 10 to digital information. This process may also be termed decimal association, in that the data encoded in whatever form may be suitable on the card in each case is associated with a specified decimal number which is thereafter employed in the process taking place in the system of FIG. 3 for generation of a security number. The converter 50 is designed to convert magnetically coded information, which in the illustrated embodiment shall be considered to be customer account information, from the stripe 10 to a number, in a well-known manner and the converter 52 is designed to convert data, which is the illustrated embodiment shall be considered to be uniqueness information, sensed from the diffraction grating stripe 14, to a number in a suitable manner such as is shown, for example, in the previously mentioned U.S. application Ser. No. 588,937.

The output from the converter 50 is connected to the input of a contraction means 54, which is capable of contracting the length of the account number sensed from the stripe 12 to a length of "K" digits, equal in length to the "K" digit length of the uniqueness number sensed from the stripe 14. Normally, the account number contains more digits than the uniqueness number, but if the converse were true, it is obvious that the uniqueness number, rather than the account number, could be contracted. The contracting means 54 essentially comprises an adder, which enables it to perform the desired mathematical operations to produce the desired contraction, as will subsequently be described.

The output of the contraction means 54 is applied to one input of an arithmetic processor 56, the other input of which is connected to a terminal 60, to which is applied a selected constant, with which the contracted account number from the means 54 is combined, in a multiplication operation, as subsequently defined. Similarly the output from the converter 52 is applied to one input of a second arithmetic processor 58, the other input of which is connected to a terminal 62, to which is applied a second selected constant, with which the uniqueness number from the converter 52 is combined, in a multiplication operation, as subsequently defined.

The outputs of the arithmetic processors 56 and 58 are applied to permutators or shufflers 64 and 66, respectively. In each of these shufflers, cross-connections are made so that the order of the individual digits of the account number and the uniqueness number is shuffled or permutated, in a well-known manner.

The individual digit outputs from the shufflers 64 and 66 are then applied to inputs of an arithmetic logic processor 68, in which various arithmetic or logical operations, which may be generically referred to as mathematical operations, can be performed upon each of the digital outputs from the shufflers 64 and 66, according to a predetermined scheme, to provide a further manipulation, combination or alteration of the digits derived from the account number and the uniqueness number. Certain of the components within the arithmetic logic processor 68 which perform the desired functions are indicated by reference characters 70, 72 and 74, which components are shown as operating upon combinations of digit outputs from the shufflers 64 and 66. The components 70, 72 and 74 are merely representative, and do not represent all of the functions which could be performed in the arithmetic logic processor 68. The components 70, 72 and 74 could, if desired, each take the form of a suitable integrated circuit chip, such as the SN74LS181 four-bit arithmetic logic unit/function generator manufactured by Advanced Micro Devices Inc. for example.

Outputs from the various components of the arithmetic logic processor 68 are then applied to a compression means 76, comprising a gating network which may, for example, essentially comprise a plurality of exclusive OR gates which function to reduce the total number of digits applied thereto from the arithmetic logic processor 68 to a number which can conveniently be recorded on the stripe 12 as the security number, and which appears on the output 78 of the compression means 76.

The algorithm which is implemented in the system of FIG. 3 will now be described in terms of a series of steps which correspond generally to the various blocks shown in FIG. 3. This algorithm has been devised for mapping the account number A and the uniqueness number U into the security number S. Typically there are 8 to 19 digits in the account number A; 8 to 12 digits in the uniqueness number U and 5 to 8 digits in the security number S. Therefore, in general, there will be numerous combinations of A and U which will be mapped onto each possible value of S.

This algorithm was developed primarily for use with the credit card uniqueness feature, and the notation adopted is appropriate for this application. Other applications of the basic algorithm are possible, however, such as error checking for data communication or testing of passwords for access to secure facilities. For this reason, the following description of the algorithm will be stated in general mathematical terms.

DESCRIPTION OF ALGORITHM

Situations exist which require that the elements from two primary sets A and U be mapped into the members of a secondary set S. The set of possible combinations of elements of A with elements of U, in general, will far exceed the number of elements in S, so that many possible combinations of A and U will be mapped into each value of S. An algorithm is required to define the mapping procedure. It should be sufficiently complex so that a criminal could not reconstruct the algorithm from a small or medium size sample of encoded cards.

The mapping proceeds in six steps as outlined below, with reference to the various blocks shown in FIG. 3.

STEP 1 DECIMAL ASSOCIATION (Blocks 50 and 52)

With each element in the set A, associate a unique decimal number A which is L digits in length. Choose L such that $10^L$ is greater than the number of elements in set A. Similarly, associate a unique K-digit number with the elements of U, such that $10^K$ is greater than the number of elements in set U.

In the simplest case, where the elements of A and U are decimal integers, this step is unnecessary. In other cases a binary-to-decimal conversion may be required. In the general case (where possibly A or U consists of alphanumeric data), any appropriate mapping of the elements of the primary sets into decimal integers may be chosen. The result of this decimal association process will be an L-digit decimal number A and a K-digit decimal number U.

STEP 2 CONTRACTION (Block 54)

If $K \neq L$, it is necessary to decrease the length of the longer number to match that of the smaller number. Assume without loss of generality that $L > K$. Then generate from A (the L-digit number) a K-digit number A'.

If $A = a_L \ldots a_{K+1} a_K \ldots a_2 a_1$
then $A' = a'_K a'_{K-1} \ldots a'_2 a'_1$
where $a'_1 \,(\text{Mod } 10) = a_1 + a_{K+1} + a_{2K+1} + \cdots$ $a'_2 \,(\text{Mod } 10) = a_2 + a_{K+2} + a_{2K+2} + \cdots$

.
.
.

$a'_K \,(\text{Mod } 10) = a_K + a_{2K} + a_{3K} + \cdots$

.
.
.

with $a_i = 0$ for $i > L$

If $K > L$, then the contraction process would be applied in a similar manner to the number U, rather than to A.

STEP 3 MULTIPLICATION (Blocks 56 and 58)

In Step 3, the digits in A' and U are multiplied by a set of selected constants in order to complicate any attempt to decipher the algorithm. The result will be a mapping of A' into X and U into Y. The multiplication is expressed mathematically as X = K least significant digits of $$\sum_{i=1}^{K} c_i \cdot a'_i \cdot 10^{i-1}$$

Y = K least significant digits of $$\sum_{i=1}^{K} d_i \cdot u_i \cdot 10^{i-1}$$

where
$a'_i =$ the digits of A'
$u_i =$ the digits of U
$c_i, d_i =$ randomly selected digits chosen from the set [1, 3, 7, 9]

The selection of the c's and d's is arbitrary, but it is important that they be restricted to the set [1, 3, 7, 9]. If other integers are used then it will frequently happen that two different values of A (or U) will yield the same values for X (or Y), which is undesirable.

Alternatively, step 3 could be implemented by the equations.

| | |
|---|---|
| $x_i \,(\text{Mod } 10) = c_i a'_i$ | $i = 1, 2, \ldots K$ |
| $Y_i \,(\text{Mod } 10) = d_i u_i$ | $i = 1, 2, \ldots K$ |

This reduces the security of the algorithm slightly, but would be much easier to implement.

STEP 4 PERMUTATION (Blocks 64 and 66)

To further protect the algorithm from deciphering, the order of the digits of X and Y are permuted in an arbitrary manner. This generates new values, X' and Y', with the same digits as X and Y, but arranged in a different order.

STEP 5 COMBINATION (Block 68)

In step 5 the digits in X' and Y' are combined arithmetically and/or logically. The procedure is to select (with replacement) a set of K functions, $\theta_1$ through $\theta_K$, from the following list, which is merely representative, since many other functions could be chosen if desired:
+ addition
− subtraction
∨ exclusive OR $\overline{\forall}$ exclusive OR, result complemented
V logical OR
$\overline{V}$ logical OR, result complemented
$\wedge$ logical AND
$\overline{\wedge}$ logical AND, result complemented Corresponding digits of X' and Y' are then used as inputs to these functions to produce K digits, $z_1$ through $z_K$, where $$z_i = x'_i \theta_i y'_i$$

For example, if $\theta_3$ is $\overline{V}$, then $$z_3 = x'_3 \overline{V} y'_3$$

The logical operations described immediately above are performed on the individual bits of the binary coded decimal representation of the numeric digits. Arithmetic operations which result in negative numbers will be expressed in two's complement form, truncated to the four least significant bits. The result of step five will be K digits, $z_1$ through $z_k$, which are a thoroughly encrypted combination derived from the account number A and the uniqueness number U. Note that it is possible that some of the $z_i$'s will no longer be valid binary coded decimal characters. This will be corrected as part of step 6.

STEP 6 COMPRESSION (Block 76)

The final step is to reduce the K digits, $z_1$ through $z_k$, to a number S which can be recorded on the magnetic stripe, where $S = s_J s_{J-1} \ldots s_2 s_1$. This will be accomplished by exclusive-ORing selected $z_i$'s and changing the high order bit to zero whenever an invalid binary coded decimal character is generated. If S is to be J digits long, the operation is accomplished according to the following equations.

$$s_1 = z_1 \, \forall \, z_{J+1} \, \forall \, z_{2J+1} \, \forall \ldots$$
$$s_2 = z_2 \, \forall \, z_{J+2} \, \forall \, z_{2J+2} \, \forall \ldots$$
$$s_J = z_J \, \forall \, z_{2J} \, \forall \, z_{3J} \, \forall \ldots$$

with $z_i = 0$ for $i > K$

If any of the $s_i$ are not valid binary coded decimal numbers, the high order bit is changed to zero.

The six steps described above constitute the process for deriving the J-digit value of S from the L-digit number A and the K-digit number U. The procedure was segmented into six steps for clarity of explanation. In actual practice adjacent steps may be conveniently combined for simplicity of implementation.

EXAMPLE

For purposes of illustration, assume $$A = 6\;4\;8\;1\;8\;(L=5)$$

$$U = 9\;6\;2\;(K=3)$$

and that S is to be 2 digits long. (In actual applications, the length of the numbers will normally be much longer). We further assume that the following user-determined parameters have been selected to implement the algorithm.

| | | |
|---|---|---|
| $c_3 c_2 c_1$ | : | 7 3 9 |
| $d_3 d_2 d_1$ | : | 3 9 7 |
| X' permutation sequence | : | 1→3 2→1 3→2 |
| Y' permutation sequence | : | 1→1 2→3 3→2 |
| $\theta_3 \theta_2 \theta_1$ | | +, V, $\overline{\wedge}$ |

We now proceed to derive S from this data.

STEP 1 ASSOCIATION

Step 1 is not required since A, U, and S are decimal integers.

STEP 2 CONTRACTION

Since L > K, the 5 digit account number A must be shortened to 3 digits as described previously. Following the equations given previously $$A = a_5 a_4 a_3 a_2 a_1 = 6\;4\;8\;1\;8$$

$$A' = a'_3 a'_2 a'_1$$

where $$a'_1 \,(\text{Mod } 10) = a_1 + a_4 = 8 + 4 = 2 \,(\text{Mod } 10)$$

$$a'_2 \,(\text{Mod } 10) = a_2 + a_5 = 1 + 6 = 7 \,(\text{Mod } 10)$$

$$a'_3 = a_3 = 8$$

Therefore $A' = 872$

STEP 3 MULTIPLICATION

X = 3 least significant digits of $$\sum_{i=1}^{3} c_i \cdot a'_i \cdot 10^{i-1}$$
$$= 9 \cdot 2 \cdot 10^0 + 3 \cdot 7 \cdot 10^1 + 7 \cdot 8 \cdot 10^2 = 5828$$

X = 828

Y = 3 least significant digits of $$\sum_{i=1}^{3} d_i \cdot u_i \cdot 10^{i-1}$$
$$= 7 \cdot 2 \cdot 10^0 + 9 \cdot 6 \cdot 10^1 + 3 \cdot 9 \cdot 10^2 = 3254$$

Y = 254

STEP 4 PERMUTATION

Given the permutation sequence set forth above for X' and Y', X' becomes 882 (from 828) and Y' becomes 524 (from 254).

STEP 5 COMBINATION $$z_3 = x'_3 \theta_3 y'_3 = 8 + 5 = 13 = 1101 \text{ (binary)}$$

$$z_2 = x'_2 \theta_2 y'_2 = 8 \, V \, 2 = 1000 \, V \, 0010 \text{ (binary)} = 1010$$

$$z_1 = x'_1 \theta_1 y'_1 = 2 \, \overline{\wedge} \, 4 = \overline{0010 \wedge 0100} = \overline{0000} = 1111$$

STEP 6 COMPRESSION

The final step is to reduce the three $z_i$'s to a 2 digit value for S.

$$s_1 = z_1 \, \forall \, z_3 = 1111 \, \forall \, 1101 = 0010 = 2 \text{ (decimal)}$$
$$s_2 = z_2 = 1010. \text{ Since this is an invalid BCD number}$$
(10), it is changed to a valid BCD number by changing the high-order bit to 0, yielding 0010. = 2 (decimal)

$S = 22$

This completes the sample derivation of a two-digit value for S from a five-digit account number A, and a three digit uniqueness number U.

Security is a critical problem in any encryption procedure. The non-linearities inherent in modulo 10 arithmetic and logical operations make it highly improbable that any simplified algorithm could produce equivalent results. Even if a criminal were aware of the basic procedure employed, he would still need to determine the values of the arbitrary parameters $c_i$, $d_i$, and $\theta_i$, as well as the permutation sequence used in Step 4. The number of possible patterns can be calculated from the data illustrated in table 1.

TABLE 1

| PARAMETER | NUMBER OF PATTERNS |
|---|---|
| $c_i$ | $4^K$ |
| $d_i$ | $4^K$ |
| Permutations | $(K!)^2$ |
| $\theta_i$ | $8^K$ |

Multiplying these factors together shows that there are $$4^{2K}(K!)^2 8^K$$

possible choices for the parameters. For $K=15$, for example, this yields a total of approximately $10^{55}$ different implementations of the algorithm. This would make any attempt at deciphering a formidable task.

As explained earlier, the procedure described above is used to generate the value for S when the card is originally encoded, and is also used to generate the test value appearing on conductor 30 whenever the card is used. As shown in FIG. 2, the value S is read from the card and compared, digit by digit, to the value of S' as generated by the algorithm. If the two values match, the financial transaction will be permitted to continue. If a mismatch occurs, the financial transaction will not be allowed to proceed, and at the discretion of the financial institution, the card may be captured as potentially counterfeit.

The algorithm has been discussed primarily with respect to applications in card uniqueness systems. Other applications are possible, however, whenever the members of two distinct sets A and U are to be mapped into the elements of a smaller set S.

The algorithm can also be applied to mapping of a single large set A into a small set S. This could be accomplished by one of two methods. One alternative would be to choose an arbitrary constant value for U, and follow the same procedure outlined earlier. Another alternative would be to divide the digits of the L-digit number A into two segments, one segment K digits long and the other segment (L-K) digits. The first segment would be treated as "U" and the second as "A", and the same mapping procedure could be employed.

While the forms of the invention illustrated and described herein are particularly adapted to fulfill the objects aforesaid, it is to be understood that other and further modifications within the scope of the following claims may be made without departing from the spirit of the invention.

What is claimed is:

1. A method for testing the legitimacy of an identification element comprising the steps of:

(a) sensing at least three categories of information from said identification element;

(b) performing a mathematical operation utilizing at least two of said categories of information; and (c) comparing the result of said mathematical operation with another of said categories of information.

2. The method of claim 1 in which at least two of the categories of information are sensed in one operation and another category of information is sensed in a second operation.

3. The method of claim 1 in which the mathematical operation of step (b) includes the steps of multiplication, permutation and combination.

4. The method of claim 1 in which the mathematical operation of step (b) includes the steps of decimal association, contraction, multiplication, permutation, combination and compression.

5. Apparatus for testing the legitimacy of an identification element, comprising sensing means for sensing first, second and third categories of information from said identification element;

first storage means for storing the first category of information sensed from the identification element;

second storage means for storing the second category of information sensed from the identification element;

third storage means for storing the third category of information sensed from the identification element;

information processing means to generate output data from a specified sequence of operations performed upon said first and second categories of information transmitted to said information processing means from said first and second storage means; and comparison means for comparing said output data with said third category of information transmitted from said third storage means and capable of indicating whether or not said output data and said third category of information are identical.

6. The apparatus of claim 5 in which the sensing means includes first sensing means for sensing the first and third categories of information and second sensing means for sensing the second category of information.

7. The apparatus of claim 6 in which the second sensing means is capable of sensing a different type of encoding than the first sensing means.

8. The apparatus of claim 6 in which the first sensing means is capable of sensing magnetically encoded information.

9. The apparatus of claim 6 in which the second sensing means is capable of sensing information encoded in the form of diffraction gratings.

10. The apparatus of claim 5 in which the first and third storage means are included in a single storage register.

11. The apparatus of claim 5, also including means associated with the information processing means for providing output data to be encoded on an identification element as said third category of information.

12. The apparatus of claim 5, in which the information processing means comprises means for making the lengths of the two categories of information equal;

means for multiplying each of the two equal-length categories of information by a constant to produce two data products;

means for permuting in an arbitrary manner the order of individual elements of the two data products to produce two permuted data products; and means for combining the two permuted data products by a plurality of mathematical functions to provide said output data.

13. Apparatus for testing the legitimacy of an identification element, comprising magnetic sensing means for sensing a magnetically encoded account number and a magnetically encoded security number from said identification element;

optical sensing means for sensing a permanently encoded uniqueness number from said identification element;

first storage means for storing the account number information sensed from the identification element;

second storage means for storing the uniqueness number information sensed from the identification element;

third storage means for storing the security number information sensed from the identification element;

information processing means to generate output data from a specified sequence of operations performed upon said account number information and said uniqueness number information transmitted to said information processing means from said first and second storage means; and comparison means for comparing said output data with said security number information transmitted from said third storage means and capable of indicating whether or not said output data and said security number information are identical.

14. Apparatus for generating a security number from first and second data representations comprising means for making the length of the two data representations equal;

means for multiplying each of the two equal-length data representations by a constant to produce two data products;

means for permuting in an arbitrary manner the order to individual elements of the two data products to produce two permuted data products; and means for combining the two permuted data products by a plurality of mathematical functions to provide a security number derived from said first and second data representations.

15. The apparatus of claim 14 in which said plurality of mathematical functions includes means for performing logic functions.

16. The apparatus of claim 14 in which said plurality of mathematical functions includes means for performing arithmetic functions.

17. The apparatus of claim 14 in which said plurality of mathematical functions includes means for performing both logic functions and arithmetic functions.

18. The apparatus of claim 14, also including means for producing an associated decimal number for either of the first and second data representations not in decimal form.

19. The apparatus of claim 14, also including means for compressing the security number produced by combining the two permuted data products to produce a security number of reduced length.

20. Apparatus for generating a security number from first and second numbers comprising means for producing an associated decimal number for either of the first and second numbers which is not in decimal form;

means for decreasing the length of the longer of the two decimal numbers to that of the shorter number;

means for multiplying each of the two numbers of equal length by a selected constant to produce third and fourth numbers;

means for permuting in an arbitrary manner the order of the digits of the third and fourth numbers to produce fifth and sixth numbers;

means for combining the fifth and sixth numbers; and means for compressing the number produced by combining the fifth and sixth numbers to a security number of the desired length.

21. The apparatus of claim 20 in which the means for combining the fifth and sixth numbers includes a plurality of mathematical functions.

* * * * *

UNITED STATES PATENT OFFICE
CERTIFICATE OF CORRECTION

Patent No. 4,094,462　　　　　　　Dated June 13, 1978

Inventor(s) John L. Moschner

It is certified that error appears in the above-identified patent and that said Letters Patent are hereby corrected as shown below:

Column 14, line 2, cancel "to" (first occurrence) and substitute --of--.

Signed and Sealed this

Twenty-seventh Day of February 1979

[SEAL]

Attest:

RUTH C. MASON
*Attesting Officer*

DONALD W. BANNER
*Commissioner of Patents and Trademarks*